United States Patent
Lim et al.

(10) Patent No.: US 8,467,144 B2
(45) Date of Patent: Jun. 18, 2013

(54) DETERMINING MICROACTUATOR FAILURE IN A MULTI-STAGE TRACKING SYSTEM

(75) Inventors: Kang Hai Lim, Singapore (SG); Chi Zhang, Singapore (SG); Bi Qiang, Singapore (SG); Yuheng Wang, Singapore (SG); Choon W. Ng, Singapore (SG); Mingzhong Ding, Singapore (SG); KianKeong Ooi, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 230 days.

(21) Appl. No.: 13/102,691

(22) Filed: May 6, 2011

(65) Prior Publication Data

US 2012/0281310 A1 Nov. 8, 2012

(51) Int. Cl.
*G11B 5/596* (2006.01)
(52) U.S. Cl.
USPC .................................................. 360/78.05

(58) Field of Classification Search
None
See application file for complete search history.

(56) References Cited

U.S. PATENT DOCUMENTS

| | | | |
|---|---|---|---|
| 7,072,134 B1 | 7/2006 | Hirano et al. | |
| 7,079,338 B1 | 7/2006 | Semba et al. | |
| 7,106,552 B2 | 9/2006 | Hirano et al. | |
| 2006/0109586 A1 | 5/2006 | White et al. | |
| 2010/0201290 A1 | 8/2010 | Becker et al. | |

OTHER PUBLICATIONS

Jun. 30, 2004, Kobayashi et al., "Adaptive Control of Dual-Stage Actuator for Hard Disk Drives", Proceeding of the 2004 American Control Conference, Boston, MA Jun. 30, 2004-Jul. 2, 2004, pp. 523-528.

*Primary Examiner* — Paul Huber
(74) *Attorney, Agent, or Firm* — Hollingsworth Davis, LLC

(57) ABSTRACT

A multi-stage tracking control system includes at least a main actuator and a microactuator. The tracking control system is switched to a single-stage mode so that the main actuator alone provides tracking. A disturbance signal is applied to the microactuator while in the single-stage mode, and a failure condition of the microactuator is determined based on a position error generated in response to the disturbance signal.

20 Claims, 7 Drawing Sheets

DETERMINING MICROACTUATOR FAILURE IN A MULTI-STAGE TRACKING SYSTEM

SUMMARY

Various embodiments described herein are generally directed to methods, systems, and apparatuses that facilitate determining microactuator failure in a multi-stage tracking system. In one embodiment, a method involves switching a dual-stage tracking control system of data storage device to a single-stage mode, wherein the dual-stage control system comprises a main actuator and a microactuator, and wherein the main actuator alone provides tracking in the single-stage mode. A disturbance signal is applied to the microactuator while in the single-stage mode, and a failure condition of the microactuator is determined based on a position error generated in response to the disturbance signal.

In another embodiment, an apparatus includes at least one controller that controls a dual-stage tracking system having a main actuator and a microactuator that cooperatively provide tracking for a data storage device. The controller is configured to switch the dual-stage tracking system a single-stage mode. The main actuator alone provides tracking in the single-stage mode. The controller is further configured to apply a disturbance signal to the microactuator while in the single-stage mode, and determine a failure condition of the microactuator based on a position error generated in response to the disturbance signal.

In another embodiment, a system includes a dual-stage tracking device having at least a main actuator and a microactuator. The system also includes at least one controller coupled to the dual-stage tracking device. The at least one controller is configured to switch the dual-stage tracking device a single-stage mode. The main actuator alone provides tracking in the single-stage mode. The controller is further configured to apply a disturbance signal to the microactuator while in the single-stage mode, and determine a failure condition of the microactuator based on a position error generated in response to the disturbance signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates generally to techniques for detecting microactuator failures in devices. For example, various embodiments described below pertain to detecting microactuator failures in dual-stage actuation of hard drive read/write heads. With the increasing demand for high data capability and high areal density of hard disc drives (HDD), micro-actuators are deployed to achieve higher data track density and improve servo performance. Dual-stage actuators may include a primary actuator such as a voice coil motor (VCM) for general/primary tracking control, and a microactuator for finer tracking control. While the embodiments shown below may describe dual-stage actuator configurations, the concepts may also be applicable to actuation systems having more than two control stages. Similarly, while some embodiments are described generally as HDDs, it will be appreciated that the concepts described hereinbelow are fully applicable to all manner of data storage devices, including hybrid drives, heat-assisted magnetic recording (HAMR), bit-patterned media (BPM), shingled recording devices, etc.

Figure 1A:
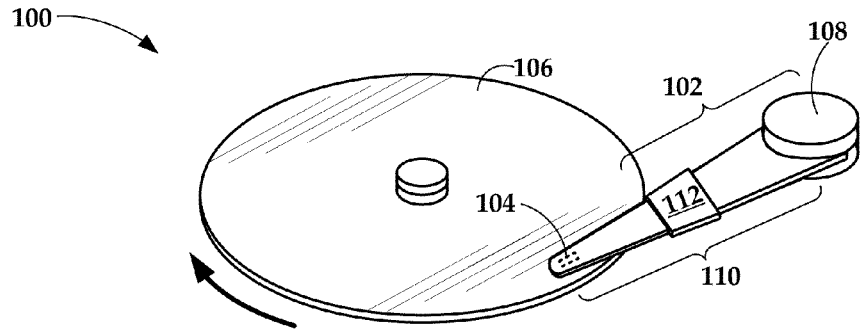
FIG. 1A is a perspective view of an apparatus according to an example embodiment.

In reference now to FIG. 1A, a perspective view illustrates components of an apparatus 100 according to an example embodiment. The apparatus 100 may be configured as a data storage device such as a hard disk drive (HDD). The apparatus 100 utilizes a dual-stage actuating system 102 to position a slider 104 over a magnetic media 106 (e.g., a hard disk). The dual-stage actuating system 102 includes a VCM 108 that drives an arm 110 with the slider 104 mounted at the end. The dual-stage actuating system 102 also includes a microactuator 112 mounted in the arm 110 for fine tracking control of the slider 104. The slider 104 may include a read/write head that records to and reads from the media 106. While only one arm 110 and slider 104 is shown, the apparatus 100 may include multiple such arms, one for each surface of each disk 106 employed in the apparatus 100. Each arm may contain a microactuator for individual fine tracking control, although all arms may be commonly driven by the VCM 108.

The illustrated microactuator 112 is shown located within a suspension of the arm 110. In other configurations, the microactuator 112 may be positioned elsewhere, such as between the end of the arm 110 and the slider 104. Generally, the microactuator 112 may be located anywhere in the apparatus 100 where it can assist a primary tracking control component such as the VCM 108. The secondary tracking functions of the micro-actuator 112 may include fine/fast tracking control, reduction of run-out and other functions that generally improve drive performance. While the illustrated dual-stage actuating system 102 is shown as driving a pivoting arm 110, concepts described below may be applicable to other types of drive systems, e.g., linear tracking arms.

Figure 1B:
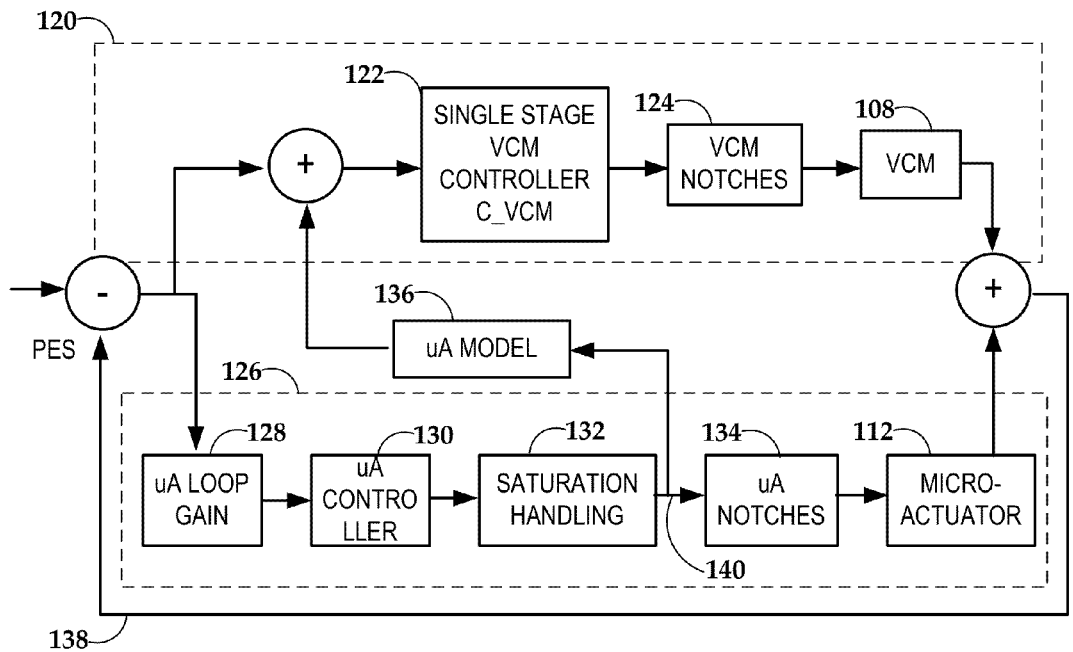
FIG. 1B is block diagram of a dual-stage actuator control system according to an example embodiment.

In FIG. 1B, a block diagram illustrates various components of a dual-stage controller system according to an example embodiment. The main/first control loop 120 (e.g., VCM loop) generally includes a VCM controller 122 and notch filters 124 that provide inputs to the VCM 108. The secondary control loop 126 (e.g., PZT loop) includes an amplification block 128, controller 130, saturation handling block 132, and notch filters 134 that provide input to the microactuator 112. Both the VCM loop 120 and the PZT loop 126 are stable loops. The PZT loop can be disabled (e.g., when entering single-stage operation) by setting the microactuator loop gain 128 to zero. A microactuator model 136 adapts unfiltered microactuator for input to the VCM loop 120. A position error sensing (PES) signal 138 provides feedback to both loops 120, 126.

The microactuator 112 may utilize any electro-mechanical induction technology known in the art. For purposes of the following discussion, the microactuator 112 is described as a piezoelectric device, although the concepts described herein may be equally applicable to other technology, e.g., magnetic induction. The micro-actuator 112 may be made of a piezoelectric material such as Lead-Zirconate-Titanate, $Pb(Zr_{0.52}Ti_{0.48})O_3$, commonly abbreviated as PZT. Microactuators made of PZT are used in HDD tracking applications. However, the identification and treatment of PZT failures described below may be applicable to other types of microactuators as well.

A number of component failure modes have been identified for PZT microactuators, such as PZT crack, de-stroke, no displacement, etc. These PZT failure modes may result in servo-related failures, such as HDD seek failures, head loading errors (during spin up process) and/or large position errors. All these servo failures may in turn may cause fatal read and write failures. A scheme of dual-stage PZT failure recovery system is therefore introduced to handle these failures. For example, the schemes may involve detecting high-level drive failures (e.g., read/write failures, seek failures.), determining if a microactuator failure caused the higher-level failure, and performing microactuator failure recovery schemes in response.

In one example, when it has been determined that a microactuator failure has occurred in a dual-stage system, a seek failure recovery scheme may turn off a micro-actuator control loop (e.g., loop 126), and the servo system goes to single-stage VCM loop in seek retry. The seek failure event counter will increase by one if dual-stage seek failed but single-stage seek retry succeeds. When the event counter consecutively increases on the same head and reaches certain threshold, the PZT of the head will be considered abnormal and the drive is forced to operate in single-stage. This preceding recovery scheme may be implemented in servo firmware and/or the high-level controller firmware (F3 code).

This disclosure also relates to a microactuator failure recovery scheme in response to failure detection. In this recovery scheme, when the read/write failed, F3 code sends a servo command to low-level servo processes to carry out microactuator checkup, record the failure, and recover the system to continue the normal processes. If the microactuator is validated to be abnormal, a microactuator failure event may be recorded into the flash memory or system zone, where it can be checked at every power-on cycle. Under some conditions, the F3 code may switch off the micro-actuator loop of the failed dual-stage controller and issue commands to force that controller to use a single-stage VCM loop.

To check whether fatal failures are caused by microactuator failure, one option (discussed in greater detail below) involves turning off the micro-actuator loop and keeping the servo system in single-stage VCM loop. The checkup procedure involves applying a disturbance signals to the microactuator while the actuating system is operating in the single-stage mode (e.g., VCM-alone). A failure condition is determined based on a position error generated in response to the disturbance signal.

A dual-stage decoupling scheme can provide loop stability in both single-stage and dual-stage modes. To switch the servo system to a single-stage loop, the microactuator loop can be turned off directly without effect to a single-stage VCM controller. This proposed microactuator failure recovery scheme could be applied to other dual-stage schemes with some changes. The described features may also be implemented in a multi-stage actuator system with more than two stages. In a system with more than two stages, a reduced operation mode may be defined analogously to the single-stage mode described for dual-stage embodiments. In the multi-stage, reduced operation mode, at least one stage (e.g., a microactuator stage) is disabled during the checking stage, while other stages may be active. Reduced operation mode may include single-stage mode, e.g., where a main/primary actuator alone performs tracking.

Two recovery operations for microactuator failure are described herein. The first recovery operation involves applying signals (e.g., a square wave) of substantial peak voltage across an electrical junction (e.g., ground joint) of the microactuator. The microactuator, in one configuration, may be made of PZT and may connect to a stainless steel ground through silver (Ag) epoxy. Silver epoxy under some temperature and pressure condition changes may occasionally accumulate a sizeable oxidation layer. The oxidation layer can cause high resistance in the PZT ground interconnect (PZT joint to stainless steel). This oxidation may ultimately cause partial loss of head stroke and/or may negatively affect PZT response to control signals.

The first recovery operation involves applying a dielectric breakdown voltage across an electrical junction (e.g., ground joint) to induce what is called voltage induced conductivity (VIC). In this disclosure, this recovery operation is collectively referred to as "PZT buzz." The PZT buzz operation involves applying a waveform (e.g., square wave, sine wave, triangle wave, etc.) having relatively high peak voltage for a predetermined period of time in an attempt to induce VIC.

There may be several forms of microactuator/PZT damage, and recoverable errors such as oxidation may first be resolved before performing further testing to evaluate and characterize microactuator/PZT condition. If these tests indicate that the microactuator is exhibiting a non-recoverable failure, a second recovery operation may be performed. In the second recovery operation, the servo controller is instructed to enter a single-stage mode, where only the main/first stage actuator (e.g., VCM) is used to control head to disc cylinder location.

The single-stage mode may be entered under a number of conditions (e.g., testing for microactuator failures), and in this recovery mode, the single-stage mode may be used long-term, such as when it has been determined that the microactuator is likely permanently damaged. This second recovery operation, collectively referred to herein as "actuator reconfiguration," may generally include determining microactuator condition based upon reliable information, and in response causing a servo controller to enter a single-stage mode for at least one read/write head.

In other arrangements, reconfiguration may also involve altering control parameters associated with the microactuator 112. In such a case, a microactuator performance may be degraded, but within accepted specification limits. To account for this degraded performance, compensation parameters may be deployed to the microactuator 112 via sets of calibration commands. In another situation where compensation at microactuator 112 would not sufficiently meet a microactuator operating specification, a microactuator may be operating out of specification, but may still be used for tracking in a reduced capacity/performance. This reconfiguration may involve altering parameters used by, e.g., microactuator controller 130, microactuator model 136, and/or notch filters 134.

In some devices, separation distances between data tracks may be significantly reduced to increase data storage density. Acceptable operation in these devices may rely on enhanced tracking performance provided by microactuators, and tracking in single-stage mode may be unacceptable for some operations. For example, performing writes in single stage mode may potentially cause damage to data stored on the disc drive. In such a case, reconfiguration may involve activating a read-only mode to suppress write functionality. Read-only mode can be achieved through standard read-only mode reporting command to the host or negative/fail/timeout response to each host write command. Setting the drive to read-only can ensure integrity of data, and can be made known to the user through standard mechanisms for reporting devices with disabled write functionality (e.g., reporting of errors when attempting to write, designation of drive as a read-only device by the operating system). During read processes, a greater variety of tracking and data recovery options can be attempted to recover data from the disc drive without risk to integrity of data. Factory and user setup/mode retrieval upon micro actuator failure are also possible options.

In another intermediate configuration, where separation distance between data tracks is not as highly optimized, integrity of data storage can be maintained by compromising on throughput performance. This can be achieved through write fault threshold (WFT) adjustment. Tracking consistency may degrade in single-stage mode and potentially cause more frequent off-track writes in between servo bursts. This might not be mitigated by a fixed number of PES sampling at servo burst. A stricter off-track threshold limit may increase sensitivity of off track write detection. In this case, a lowered write fault threshold may ensure writes are performed in a more secure and stable tracking.

The tightening of WFT can be implemented as an optional process addition to the actuator reconfiguration. In specific defined and detected operating environment conditions that may already tighten WFT, such as detected vibration conditions, a subset threshold value may be introduced to further tighten WFT when operating in single-stage tracking. The specific value of threshold reduction for normal and aggravated condition may be obtained separately through empirical studies. In both cases, it is possible the reduction of WFT may introduce discernible adverse effect to write throughput performance in both operating conditions. In most cases for a disk drive usage in a non-RAID setup, given the choice between throughput performance and integrity of data stored, preservation/reliability of user data may be a priority. For example, in a product configuration where balancing between VBAR (Variable Bit Aspect Ratio) tuning, TPI (Track Per Inch) and BPI (Bit Per Inch) margins are compromised for some reason, reduction of WFT may provide the an acceptable result from the perspective of the end user.

The recovery operations described above may be performed in at least two processes of the controller firmware. These processes have been identified as being affected by poor response of a microactuator, and so are good candidates in which to identify errors and attempt recovery. The first of these processes is referred to herein as "spin up process." In between power mode changes, including power up and power off, controller firmware may perform the spin up process. The spin up process involves spinning up the disc motor and moving the read/write head to a calibration cylinder. The controller firmware issues commands to the servo controller to move one or more targeted heads to calibration cylinder via the main actuator and a microactuator of the arm of the targeted head.

A failure in the spin up process may prevent the controller firmware from proceeding to the next process. A spin up process failure may eventually cause overall disc drive failure by preventing subsequent processes of disc read and write functions. If the microactuator response is poor, the spin up process may fail. In one arrangement, the PZT buzz can be performed at spin up in an attempt to recover. The controller may first check a time stamp that records the last time a PZT buzz was performed. If more than two hours has elapsed since the last PZT buzz, the PZT buzz will be performed. Otherwise the firmware controller will proceed with its regular spin up failure procedures, e.g., retry. The aforementioned checking of the time stamp may be skipped if the spin up process is entered in response to a power up and power off sequence.

For power up and power off sequences, the firmware controller may proceed with PZT buzz on the first spin up process failure. Each time that PZT buzz is performed, the controller saves the current time stamp in volatile memory. The recorded time stamp is used to determine elapsed time since electrical power up of the HDD and last application of PZT buzz. The time stamps are used to ensure subsequent PZT buzz applications are applied no more frequently than two or more hours. The selection of two hours as the minimum PZT buzz interval is for purposes of example and not limitation. Generally, any time interval can be used that limits the frequency of PZT buzzes, which, if performed excessively, might impact performance and reduce lifetime of some HDD components. The system designer can choose a reasonable minimum interval that optimizes overall HDD performance while still obtaining the benefits of the PZT buzz procedure.

Figure 2:
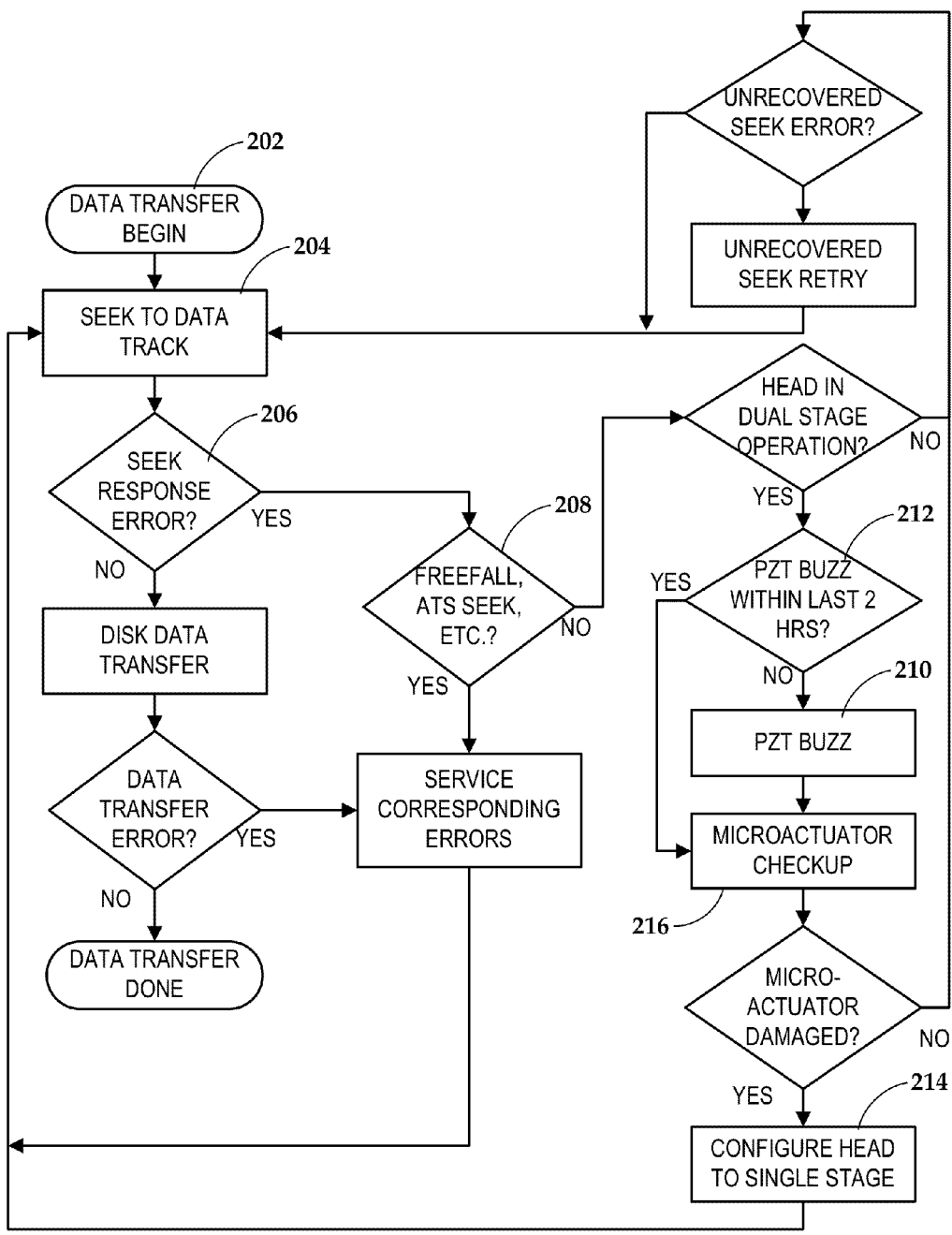
FIG. 2 is a flowchart of a data transfer operation according to an example embodiment.

A second controller firmware process that may be noticeably affected by microactuator failures is the read/write process. In FIG. 2, a flowchart illustrates an example of how read/write failures may be handled to find and remedy possible microactuator errors according to an example embodiment. On disc data transfer 202, the controller moves 204 the read/write head to pertaining data cylinder of the media disc. Failure to perform this process may manifest itself in several ways, including read/write failures, seek failures, write unsafe faults, and others. A wide sample of trials has shown that degraded PZT response eventually causes seek failures, and so this condition is tested at 206. The servo controller communicates these failures to the controller firmware in hardware registers by way of a response value such as "no error", "with retries" or "failed" (0x01, 0x05 or 0x07).

Some read/write failures, such as write unsafe fault, may have little or no correlation to microactuator failures. Thus there may be no need to perform procedures such as PZT for that class of symptoms. In some tested configurations, a seek response of "with retries" and "failed" is identified as being a signature most closely associated with a degraded PZT response during read/write processes. While these signature errors may be manifested by other causes of failure, they are nonetheless consistent with a degraded PZT response. For purposes of the present discussion, seek failures of "with retries" and "failed" are considered a minimal set of errors that may be considered a PZT failure signature. However, other firmware and HDD configurations may have a different set of errors or other conditions that are indicative of PZT failure, and the example signature is not intended to be limiting.

Upon detecting a PZT failure signature, the controller firmware may examine other conditions 208 to isolate and identify the root cause of the seek failure before deciding whether PZT buzz is needed. The firmware controller may check 208, for example, for free fall conditions, servo induced disc errors, and anticipatory track seek (ATS). If none of these alternate indicators 208 are seen, and the controller cannot identify other relevant ways to service the failure, it may branch to a subroutine that performs PZT buzz 210.

Similar to spin up process, the firmware controller may check 212 the last PZT buzz time stamp before performing PZT buzz 210. Some unique identifier value of time stamp may be used to identify that the PZT buzz has not yet been performed. This value may be programmed during initial power up sequence, e.g., before the spin up process. This time stamp value is also used during spin up process, during which an initial PZT buzz may be performed. As previously described, the time stamp may be used to ensure some minimum time (e.g., two hours) has elapsed since the last PZT buzz 210, regardless whether it was performed in response to a spin up failure or a seek failure.

Some excursion seeks made during retries do not involve disc data transfer. These excursion seeks may be used to service certain identified errors, and are considered not to require PZT buzz. For example, for both normal and full retries, with heater control, each disc data transfer may involve a re-seek. By only considering true seek errors, the recovery procedure described herein ensures only those disc data transfer failures likely due to bad PZT response will be serviced.

As described above, actuator reconfiguration may be performed in several processes of the controller firmware to prevent HDD failure. Generally actuator reconfiguration involves signaling a servo controller to enter a single-stage mode. For example, in FIG. 2, actuator reconfiguration 214 occurs after a number of detection/remediation steps have occurred, including PZT buzz 210 and a subsequent checkup process 216. An HDD operating in single-stage mode may not have the equivalent performance as one operating in dual-stage mode. However, without actuator reconfiguration, a disc drive with a damaged microactuator may repeatedly manifest various errors to host system or computer, and/or cease to function permanently. Actuator reconfiguration recovers the disc drive from this situation, and may at least allow data to be accessed for purposes such as backup.

There are several possible situations where a disc drive with damaged microactuator may fail to function correctly. Some of these situations are identified and corresponding recovery methods are introduced, including actuator reconfiguration. In the following sections, five different situations are discussed in which the controller firmware may cause the servo control system to reconfigure.

The first of these reconfiguration situations occurs during power-up initialization sequences that occur before spin up. The controller firmware maintains a set of identifiers in non-volatile memory describing a microactuator condition for the microactuators associated with each head. On power up, the controller firmware first checks for spin up head condition, e.g., a condition which was recorded the last time power was applied. For example, logical head zero may always be tested at spin up. If a value stored within non-volatile memory categorizes a microactuator associated with this head as good, the firmware proceeds to spin up the drive as normal (dual-stage seek).

With the exception of power up, the servo controller defaults all seek operations for all heads to dual-stage. If the value retrieved from non-volatile memory by the controller firmware indicates the microactuator associated with logical head zero is bad, the controller firmware proceeds to inform the servo controller to switch to single-stage seek operation. In this way, the servo controller operates as a slave in response to controller firmware commands. This may prevent signs of disc drive errors at spin up if a read/write head's microactuator has been damaged.

The second of these reconfiguration situations occurs in response to spin up failures during power mode changes other than power up. When a power mode changes, the controller firmware may perform a spin up process. On failure of the spin up process, the controller firmware issues a command to servo controller to perform a microactuator test (e.g., checkup 216 shown in FIG. 2) to identify if microactuator of a particular read/write head has failed. Based on results of this test returned from servo controller, the controller firmware may issue an actuator reconfiguration command to servo controller. The head actuator seek operations are then based on input of controller firmware commands. The controller firmware follows the same protocol, e.g., informing servo controller to operate that head to single-stage seek if result indicates microactuator failure. Otherwise, no actuator reconfiguration is performed.

With the addition of possible recovery from microactuator failure, the controller firmware may issue servo commands to check microactuator condition if a spin up failure occurred. This procedure (e.g., checkup 216 in FIG. 2) is performed after PZT buzz (e.g., reference 210 in FIG. 2). Performing the microactuator test 216 after PZT buzz 210 allows the check up process 216 to be separated from the effect of possible PZT connection oxidation or other microactuator error conditions recoverable on the fly. Transient effects of PZT buzz have been analyzed/measured, and found to consistently cease in sub-disc-revolution time. As additional precaution, the microactuator test 216 may be performed after a re-seek upon if PZT buzz is performed. As with power mode changes, the controller firmware may perform reconfiguration upon the result returned from the servo controller.

A third situation where microactuator damage may be detected is during power up initialization sequence after spin up. Upon completion of the spin up process during power up initialization sequence, the controller firmware further initializes servo controller parameters. Here the controller firmware reads for condition of each head microactuator from non-volatile memory. At this time that the controller firmware may cause actuator reconfiguration for each head whose microactuator is categorized as bad.

A fourth situation where microactuator damage may be detected is during the read/write process, as described in greater detail above. If a microactuator failure signature is detected, a microactuator test (checkup) may be used to determine if PZT buzz to be performed. Upon meeting the criteria of having bad PZT response, PZT buzz may be performed depending on time stamp information. Then microactuator test/checkup is performed to determine if actuator reconfiguration is to be performed. The fifth situation where microactuator damage may be detected is during the read/write retry process. Similar to the read/write process, seek is involved on each disc data transfer process. The controller firmware performs microactuator checkup on seek failure on meeting the criteria of having bad PZT response.

Figure 3:
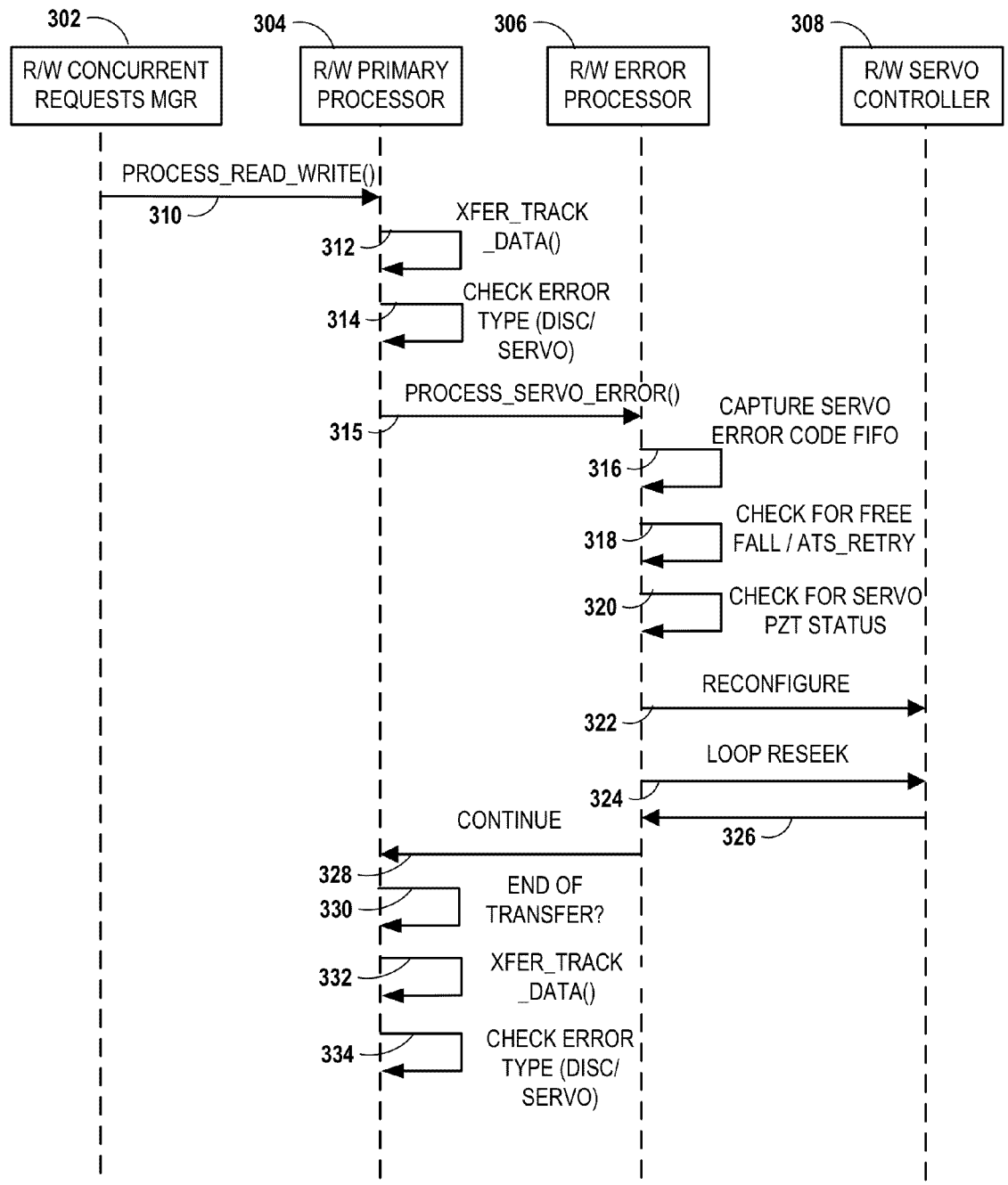
FIG. 3 is a sequence diagram of data transfer error processing according to an example embodiment.

In reference now to FIG. 3, a sequence diagram illustrates an example of actuator reconfiguration that may occur in response to read/write process and/or read/write retry process. The sequence begins when a read/write concurrent requests manager 302 sends a read/write command 310 to a read/write primary processor 304. The processor 304 then attempts 312 to perform a data transfer of the next target track, after which an error type is checked 314. In this case, a servo error is encountered for the target track, and so the read/write processor 304 collaborates with a read/write error processor 306 to process 315 the current error.

The error processor 306 may perform a number of steps in response to the process command 315. As shown here, the error processor 306 captures the error code 316, checks 318 for conditions such as free fall, ATS retry, and performs a check 320 of the PZT status. The check 320 may be equivalent to the checkup 216 shown in FIG. 2, of which more detail is provided below in the discussion of FIG. 4. Assuming check 318 did not find a cause of the errors, and check 320 indicated a failed microactuator, the error processor 306 may tell the servo controller 308 to reconfigure 322, e.g., go to single-stage mode or perform some other actuator reconfiguration operation described herein.

After reconfiguration 322, the error processor 306 tries a re-seek 324, 326 and may loop through these steps 324, 326 a number of times until successful or until retries count is exhausted. The error processor 306 may then send 328 control back to the primary processor 304 for data transfer retry. If an end of transfer check 330 indicates that the transfer did not complete, then transfer of the target track is restarted 332 and error type is again checked 334. The previous sequence 315, 316, 318, 320, 322, 324 may be repeated until the completion of the data transfer or the error cannot be further processed by the error processor 306.

The processes described above used to resolve and circumvent servo error conditions and/or defects may cause effects (e.g., delays) that are detectable by the end user. Implementations described herein may include features to minimize these effects. For example, the procedures may be performed by the controller firmware (e.g., F3 code) to minimize effects of internal component defect and error conditions on normal disc drive operation.

In one configuration, the controller firmware acts as master while servo controller as slave. The servo controller by default uses dual-stage mode to seek for all heads. After power up, the controller firmware may determine at anytime to issue an actuator reconfiguration command to instruct the servo controller to operate a particular head in dual-stage mode or single-stage mode. Upon receipt of actuator reconfiguration command from the controller firmware, the servo controller will honor that command until the next actuator reconfiguration command issued by the controller firmware or electrical power cycle. This enables invariable disposition of all process involving seeks, whether the seeks be made in single-stage or dual-stage operation.

In this role, the controller firmware discovers bad microactuator responses through detection. Detection is performed by sending commands to the servo controller. From a set of returned parameters, the controller firmware makes conclusion regarding the condition of the microactuator. Upon knowledge of the condition of the microactuator, controller firmware decides whether or not to perform actuator reconfiguration.

Robustness of procedures described above may be enhanced with triple consistency checks. First, the controller firmware may ensure a seek is successfully performed in single-stage operation. The controller firmware then checks to ensure that PES baseline is within calibrated threshold based on the results returned. If result indicates microactuator failure, the controller firmware repeats the checkup once again. Upon this, if results still indicate failure, it configures pertaining head to single-stage operation. Right after this, the controller firmware performs a seek to know if this solution solved the seek failure. If the failure is not solved, a third check is performed. If returned result indicates failure, the controller firmware proceeds with the next process, leaving the servo in single-stage operation. Otherwise, the controller firmware reverts the actuator reconfiguration. There are three types of response from servo controller for microactuator test/PZT check up command: "get status fail", "status functional", and "status not functional". In one arrangement, only the result of "status not functional" is considered likely to be caused by a microactuator failure.

An area within non-volatile memory is used to store status of the microactuator for each head. The status may be stored in the form of a numeric number that ranges from zero to some threshold value. In a newly manufactured hard drive where all microactuators are good, these values are programmed with the value of zero. The controller firmware may modify these values when performing microactuator testing and/or performing actuator reconfiguration for each head of the drive. When a value reaches the threshold number, the head microactuator is acknowledged as faulty, and the controller firmware treats the servo system appropriately (e.g., going to single-stage operation at power up for a particular microactuator).

An area of volatile memory may be used to contain information of confirmed microactuator failure detection at runtime. For each detection operation that confirms a microactuator failure for a particular head, a variable within that volatile memory may be flagged. At some point during operation, the drive may enter an idle mode (e.g., a low power mode intended to save power). Upon idle mode entry, the controller firmware may be assumed to have significantly increased available resources, including time to program data into non-volatile memory.

During this idle time, the controller firmware may check the volatile memory flag value to determine if a confirmed PZT failure has occurred. If that is the case, the controller firmware may perform another microactuator checkup before it incrementing the value in non-volatile memory. If the microactuator test yields "get status fail" or "status functional", the controller firmware resets that flag in volatile memory. Otherwise, if the test yields "status not functional", the controller firmware proceeds with programming the non-volatile memory to increase the stored value. At some threshold, a microactuator associated with a particular head may be assumed to be permanently failed. On each power up sequence, the controller firmware uses this information to perform actuator reconfiguration to avoid any effect from this internal defect being is repeatedly verified and validated. This may benefit acoustic performance of the HDD on each electrical power up.

Figure 4:
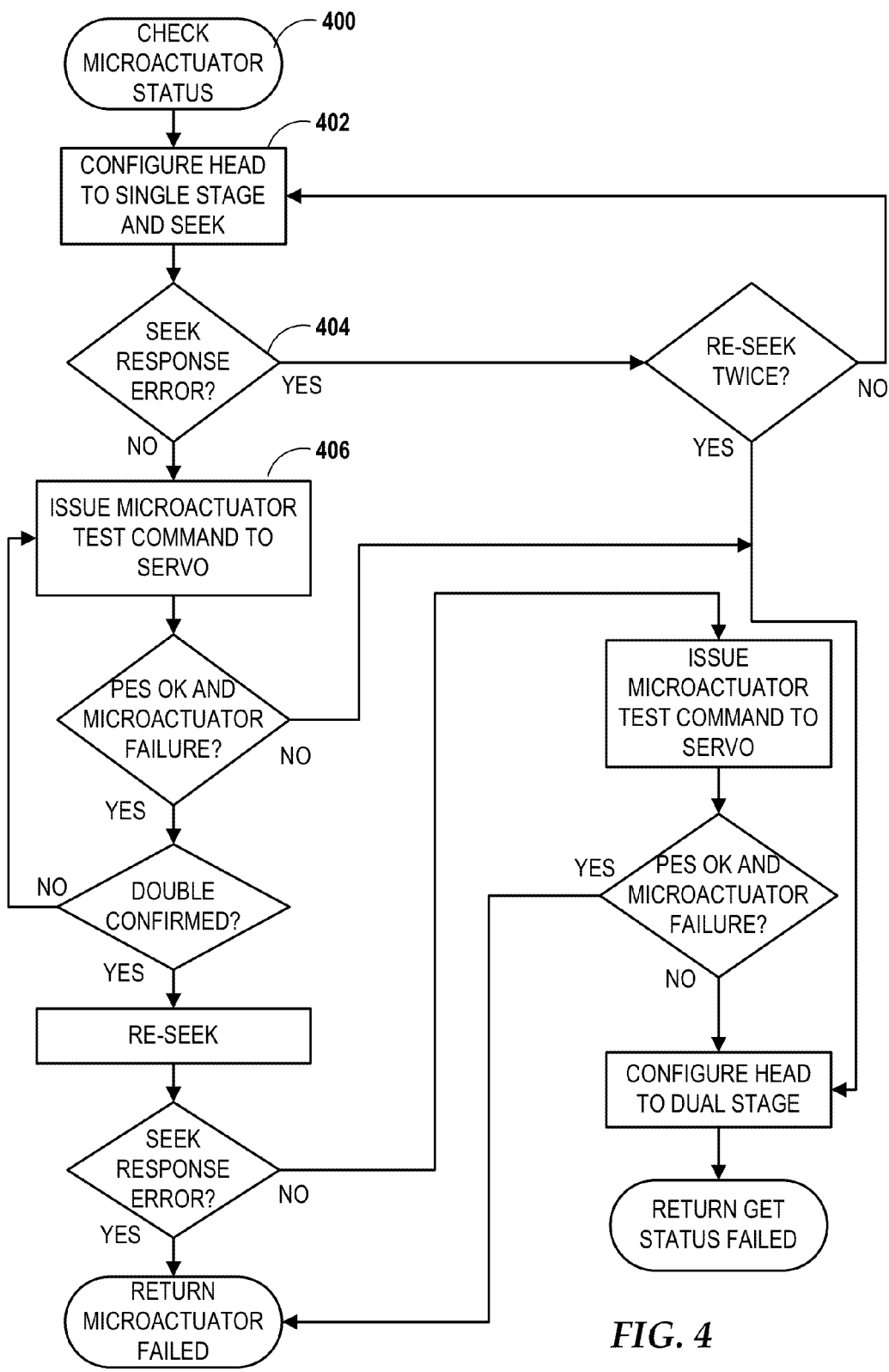
FIG. 4 is a flowchart of a microactuator check sequence according to an example embodiment.

In reference now to FIG. 4, a flowchart illustrates a procedure 400 for checking the microactuator. This procedure 400 is an example of a check process previously described occurring at block 216 of FIG. 2 and at operation 320 in FIG. 3. When the controller firmware issues a microactuator test command 400, at least one head in the drive is switched 402 to single-stage, and a seek command is issued. The success of the single-stage seek is tested at 404, and if successful, a test 406 is performed on the microactuator.

The test 406 may involve injecting a signal (e.g., a square wave pulse) into the microactuator control loop before the notch filters (e.g., at point 140 in FIG. 1B). This signal serves as a disturbance applied on the microactuator 112 through the notch filters 134, which can filter the high frequency resonances and reduce the vibrations produced therefrom. If the microactuator 112 is working properly. The position error (PES) value 138 should change significantly in response to the added disturbance. Generally speaking, after inputting the disturbance, the maximum PES value 138 from the specific read/write head tells if the respective microactuator 112 associated with the read/write head is alive.

One way of determining the desired response is to look for a sharp spike in PES after applying the disturbance. However, this may be difficult to characterize, e.g., peak value, pulse width, phase shift, etc. Therefore, an alternative way to is to measure the sum of the root mean square (RMS) value or absolute mean value of the PES before and after applying the disturbance. The sum value prior to the disturbance injection is the baseline of the position error. If this baseline value is greater than a certain threshold, it indicates there may be vibrations, or that the VCM loop 120 may have problems. If the sum of PES absolute mean values at the rising and falling edges of the disturbance are both larger than a threshold, the microactuator is considered normal. Otherwise, the microactuator will be viewed as abnormal, e.g., with low stroke value.

Figure 5A:
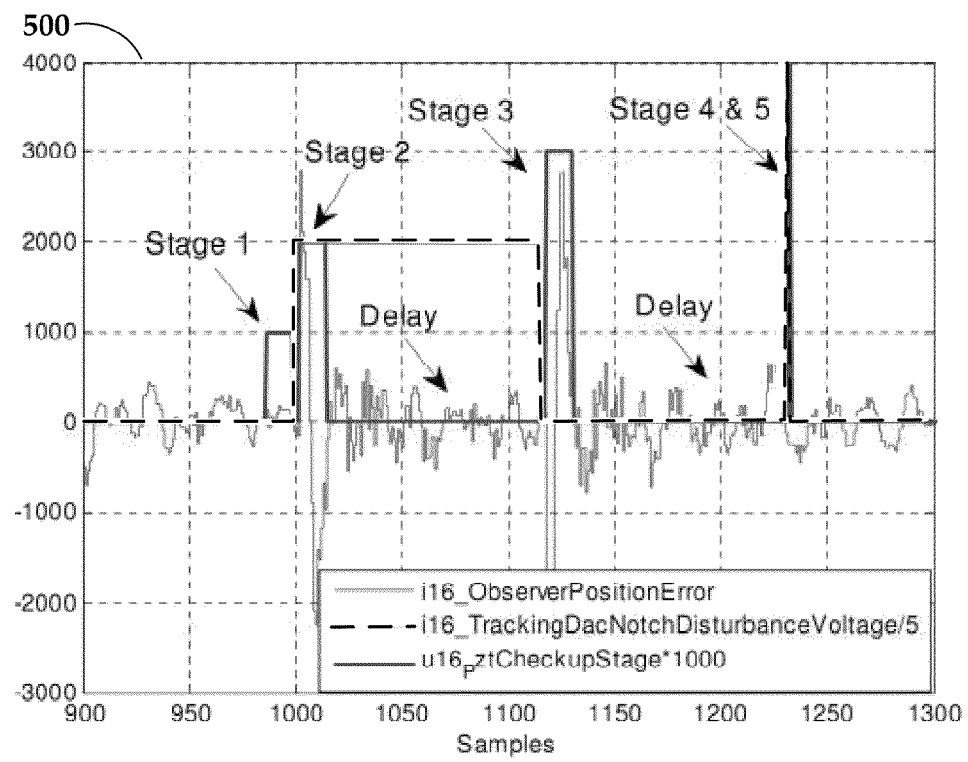
FIGS. 5A-5B are graphs illustrating the application of a microactuator test sequence to test hardware according to an example embodiment.
Figure 5B:
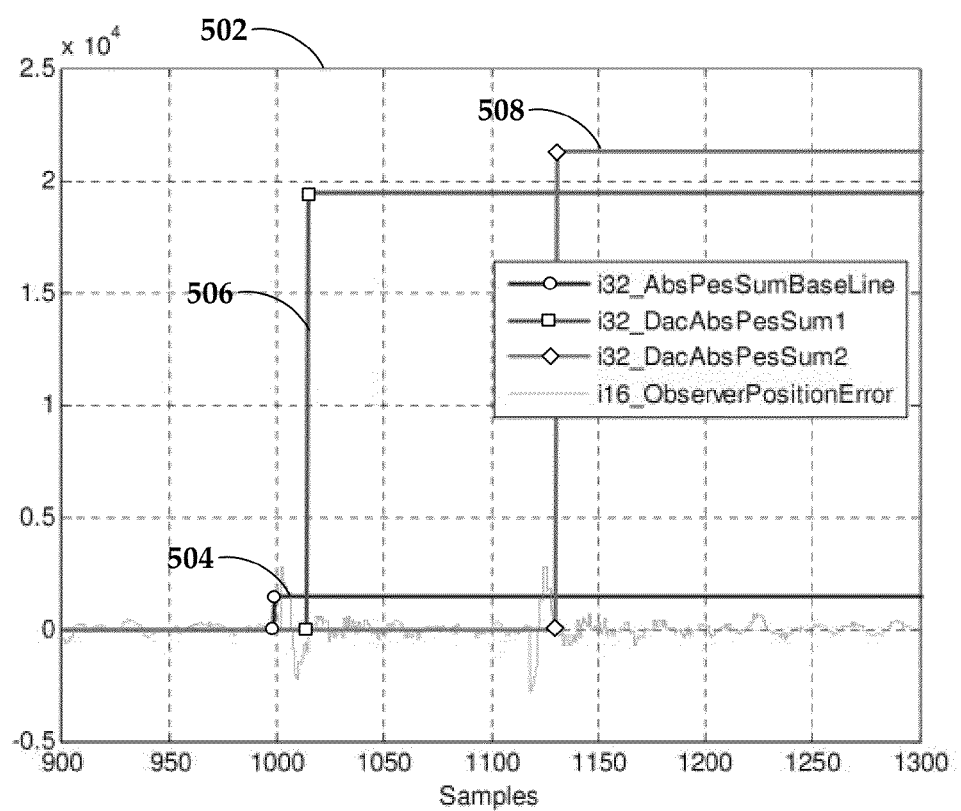

The microactuator test process may be implemented in five stages, which are shown by way of example in graphs 500 and 502 of FIGS. 5A-5B. Stage 1 involves getting the PES baseline of the tested head. As mentioned above, the head being tested first seeks to one destination track and stays on this track in single-stage mode. After waiting for several samples in ensuring diminishing the settling position errors, samples of the i16_ObserverPositionError are gathered and the absolute values are summed up during the specified sampling period. The maximum of absolute value of 'i16_ObserverPositionError' is saved as 'u16_AbsPesMaxBaseLine.' The summarized value 'i32_AbsPesSumBaseLine' 504 as shown in FIG. 5B works as a PES baseline to be compared with the absolute PES sum total after the injection of disturbance. In these figures, PES value is relative to logical track pitch scaled to a number of counts, here 4096 counts, e.g., 1 PES="size of one track pitch"/4096. The "i16_ObserverPositionError" shown in these figures is expressed in PES count. The other variables (i32_DacAbsPesSum1, i32_DacAbsPesSum2 and i32_AbsPesSumBaseLine) are sums of absolute value of PES count of all samples taken within specified window.

Both 'u16_AbsPesMaxBaseLine' and 'i32_AbsPesSumBaseLine' may be used to determine if the baseline value is greater than specified thresholds BMTH (baseline maximum PES threshold) and BATH (baseline absolute PES summed threshold), which indicate vibrations or disruptive condition that may void the result from subsequent stages. The BMTH and BATH values may be determined from the test using the following formulas:

$$BMTH=(Max.\ offtrack\ threshold\ \%)/100*4096 \quad [1]$$

$$BATH=(Avg.\ offtrack\ threshold\ \%)/100*4096*no.\ samples \quad [2]$$

Stage 2 involves getting the absolute PES sum after the disturbance rising edge. The dashed line in FIG. 5A shows the applied square wave disturbance pulse signal 'i16_TrackingDacNotchDisturbanceVoltage'. Excited by disturbance signal rising edge, the PES changes significantly and settles quickly if PZT is operating normally. The absolute PES sum value 'i32_DacAbsPesSum1' 506 shown in FIG. 5B can be measured after the disturbance rising edge in the same sampling length as the PBS baseline measurement.

Stage 3 involves getting the absolute PES sum after the disturbance falling edge. As with the leading edge disturbance 506, the absolute PES sum value 'i32_DacAbsPesSum2' 508 measured after the disturbance falling edge can also be calculated as shown in FIG. 5B. Step 4 involves comparing the absolute PES sum values 506 and 508 to the baseline 504 and making a judgment as to whether the targeted microactuator is behaving within specification. For example, if both 'i32_DacAbsPesSum1' 506 and 'i32_DacAbsPesSum2' 508 are greater than the largest of 'K*i32_AbsPesSumBaseLine' 504 and a specific threshold TH (where the value K and TH are determined by tests), the microactuator is considered normal. Otherwise, the microactuator may have failed, e.g., destroked or cracked with a small stroke value. Finally, Stage 5 involves reporting the microactuator health status, which may be written in the command response data registers which act as mailbox and can be accessed by both servo controller code and the controller firmware (F3) code.

Figure 6:
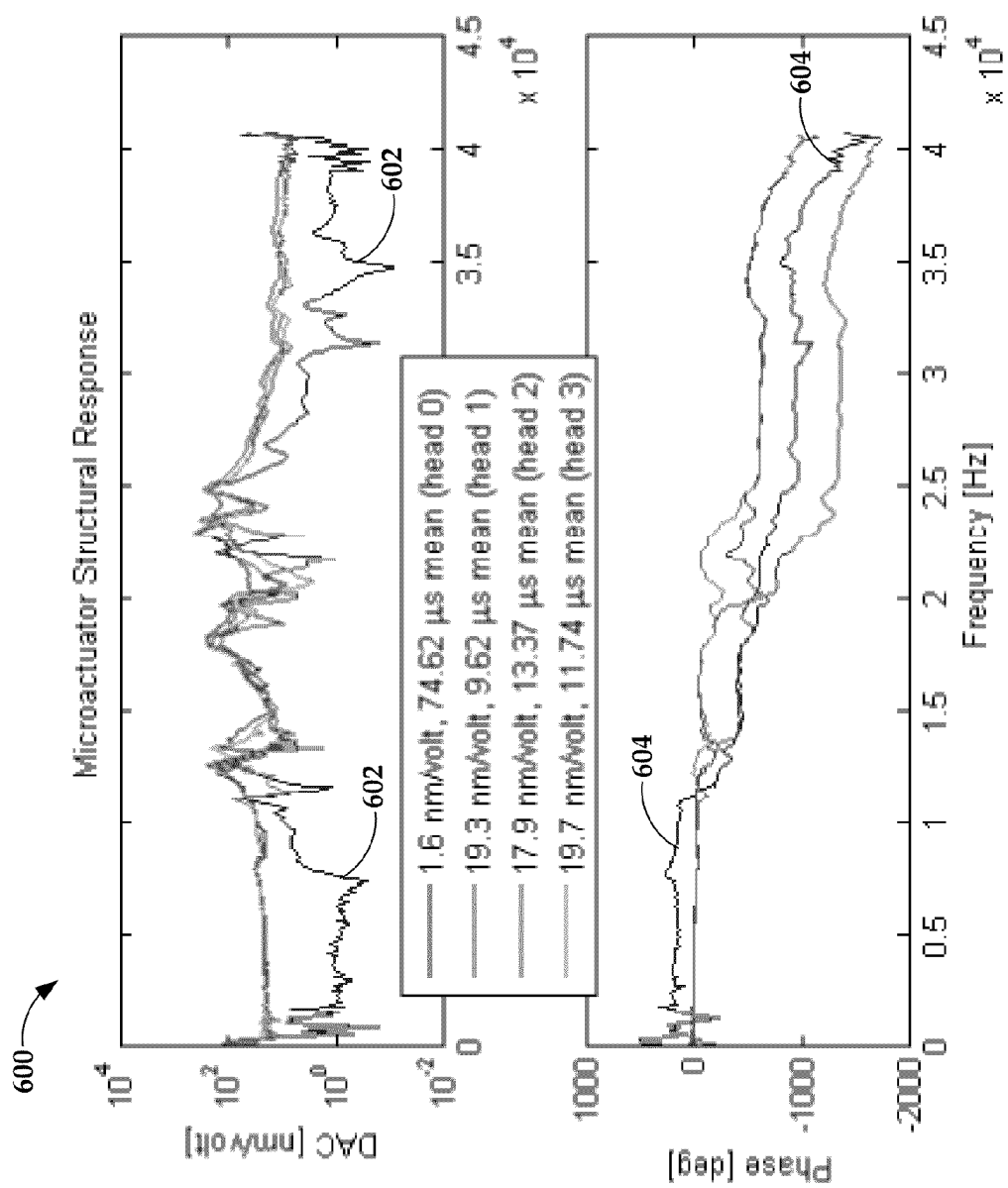
FIGS. 6 and 7 are graphs illustrating application of a microactuator test sequence to a failed unit according to an example embodiment.
Figure 7:
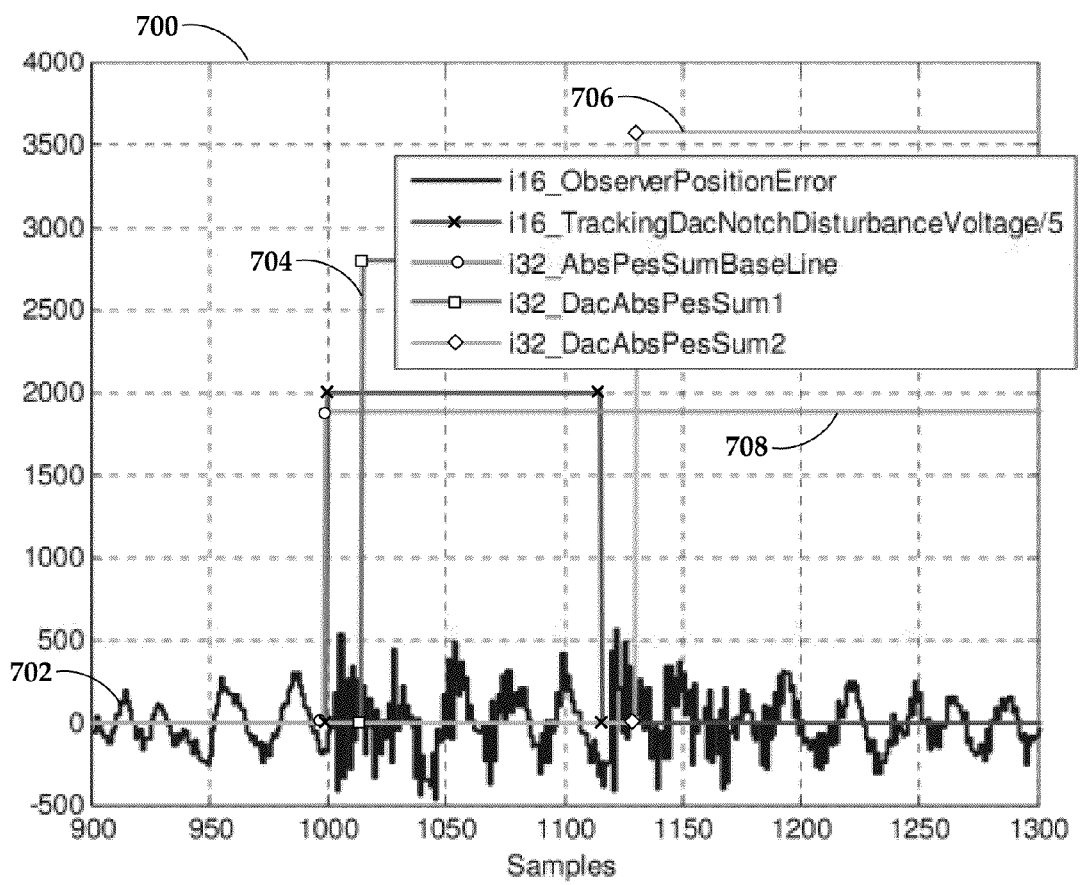

In reference now to FIGS. 6 and 7, graphs 600 and 700 represent results of a failure case study using a microactuator check procedure as described herein. In this study, a drive with four heads was examined. Graph 600 shows the microactuator structural responses of the drive. As can be seen by trace 602, the PZT microactuator of head 0 has problems. The mean magnitude of the failed PZT is 1.6 nm/volt, which is less than $\frac{1}{10}$ of the response for the other three heads. As seen by trace 604, the phase is also abnormal at low frequencies. This PZT failure was successfully detected by using microactuator check procedure as described in FIGS. 5A and 5B.

As seen by the observer position error trace 702 in graph 700, there are no significant PES pulses induced by the rising and falling edges of the disturbance pulse signal. The calculated 'i32_DacAbsPesSum1' 704 and 'i32_DacAbsPesSum2' 706 do not exceed the 'i32_AbsPesSumBaseLine' 708 by a large value (e.g., the values are less than 'K*i32_AbsPesSumBaseLine' where K>2) and response values 704, 706 also do not exceed a specific threshold value TH (e.g., K=2, TH=1000). The 'u16_AbsPesMaxBaseLine' and 'i32_AbsPesSumBaseLine' do not exceed baseline maximum thresholds BMTH and BATH, e.g., BMTH=1229, BATH=7500, where maximum offtrack threshold in percentage=30%, average offtrack threshold in percentage=15.26% (see equations [1] and [2] above).

The various embodiments described above may be implemented using circuitry, firmware, and/or software modules that interact to provide particular results. One of skill in the arts can readily implement such described functionality, either at a modular level or as a whole, using knowledge generally known in the art. The structures and procedures shown above are only a representative example of embodiments that can be used to diagnose and correct dual-stage or multi-stage actuator failures as described above. For example, the functions described occurring in a single controller may be distributed over multiple controller elements, and can be integrated with other device functionality, e.g., error correction, lifecycle management, etc.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   switching a dual-stage tracking control system of data storage device to a single-stage mode, wherein the dual-stage tracking control system comprises a main actuator and a microactuator, and wherein the main actuator alone provides tracking in the single-stage mode;
   applying a disturbance signal to the microactuator while in the single-stage mode; and
   determining a failure condition of the microactuator based on a position error generated in response to the disturbance signal.

2. The method of claim 1, wherein determining the failure condition comprises comparing first and second measurements of the position error taken at a respective rising edge and falling edge of the disturbance signal.

3. The method of claim 2, wherein comparing the first and second measurements of the position error comprises comparing the first and second measurements to at least one of a constant value and a baseline measurement of the position error taken before the application of the disturbance signal.

4. The method of claim 2, wherein the first and second measurements comprise at least one of a root mean square and an absolute mean value of the position error.

5. The method of claim 1, wherein the disturbance signal comprises a square wave pulse.

6. The method of claim 1, wherein switching to the single-stage mode, applying of the disturbance signal, and determining of the failure condition are part of a check procedure that is performed in response to at least one of an error condition and a power mode change.

7. The method of claim 6, further comprising applying a voltage waveform to the microactuator to induce a dielectric breakdown of an electrical junction of the microactuator before performing the check procedure.

8. The method of claim 7, further comprising incrementing a data entry stored in non-volatile memory in response to at least one of the check procedure and the applying of the voltage waveform, wherein an unrecoverable failure is determined based on a value of the data entry.

9. The method of claim 7, wherein applying the voltage waveform to the microactuator comprises determining an elapsed time since the voltage waveform was last applied, and foregoing subsequent applications of the waveform unless the elapsed time exceeds a predetermined value.

10. An apparatus comprising:
   at least one controller that controls a dual-stage tracking system having a main actuator and a microactuator that cooperatively provide tracking for a data storage device, wherein the at least one controller is configured to:
      switch the dual-stage tracking system to a single-stage mode, wherein the main actuator alone provides tracking in the single-stage mode;
      apply a disturbance signal to the microactuator while in the single-stage mode; and
      determine a failure condition of the microactuator based on a position error generated in response to the disturbance signal.

11. The apparatus of claim 10, wherein the at least one controller is configured to determine the failure condition by comparing first and second measurements of the position error taken at a respective rising edge and falling edge of the disturbance signal.

12. The apparatus of claim 11, wherein comparing the first and second measurements of the position error comprises comparing the first and second measurements to at least one of a constant value and a baseline measurement of the position error taken before the application of the disturbance signal.

13. The apparatus of claim 10, wherein switching to the single-stage mode, applying of the disturbance signal, and determining of the failure condition are part of a check procedure that is performed in response to at least one of an error condition and a power mode change.

14. The apparatus of claim 13, wherein the at least one controller is further configured to apply a voltage waveform to the microactuator to induce a dielectric breakdown of an electrical junction of the microactuator prior to performing the check procedure.

15. The apparatus of claim 14, wherein applying the voltage waveform to the microactuator comprises determining an elapsed time since the voltage waveform was last applied, and foregoing subsequent applications of the waveform unless the elapsed time exceeds a predetermined value.

16. A system comprising:
   a dual-stage tracking device comprising a main actuator and a microactuator; and
   at least one controller coupled to the dual-stage tracking device, wherein the at least one controller is configured to:
      switch the dual-stage tracking device to a single-stage mode, wherein the main actuator alone provides tracking in the single-stage mode;
      apply a disturbance signal to the microactuator while in the single-stage mode; and
      determine a failure condition of the microactuator based on a position error generated in response to the disturbance signal.

17. The system of claim 16, wherein switching to the single-stage mode, applying of the disturbance signal, and determining of the failure condition are part of a check procedure that is performed in response to at least one of an error condition and a power mode change.

18. The system of claim 17, wherein the at least one controller is further configured to apply a voltage waveform to the microactuator to induce a dielectric breakdown of an electrical junction of the microactuator prior to performing the check procedure.

19. The system of claim 18, further comprising a non-volatile memory, and wherein the at least one controller is further configured to increment a data entry stored in the non-volatile memory in response to at least one of the check procedure and the applying of the voltage waveform, wherein an unrecoverable failure is determined based on a value of the data entry.

20. The system of claim 19, wherein applying the voltage waveform to the microactuator comprises determining an elapsed time since the voltage waveform was last applied, and foregoing subsequent applications of the waveform unless the elapsed time exceeds a predetermined value.

* * * * *